F. G. FEELEY.
JOINT FOR CORRUGATED PAPER BOARD.
APPLICATION FILED APR. 11, 1916.
1,207,734.
Patented Dec. 12, 1916.
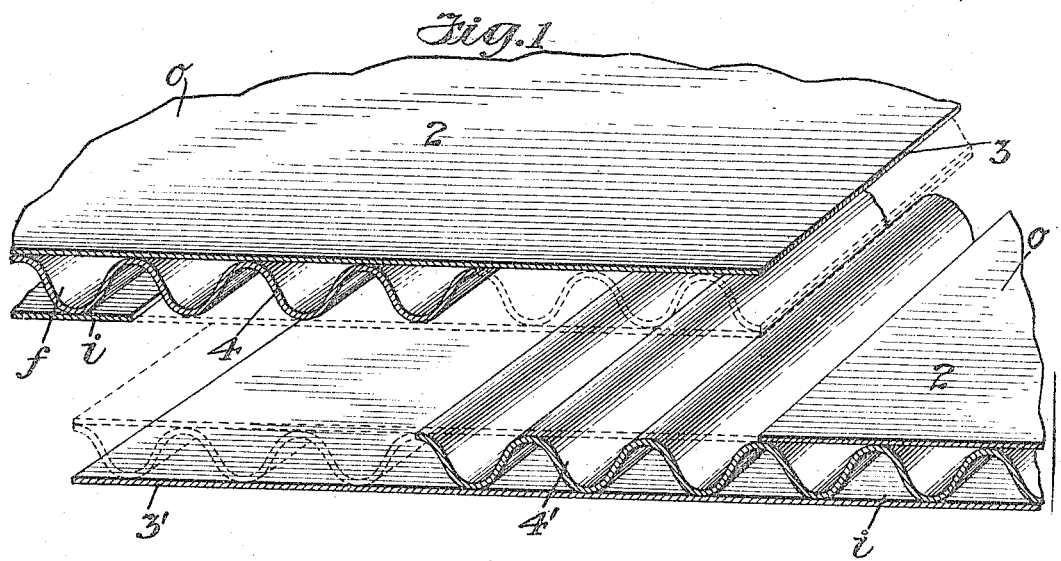
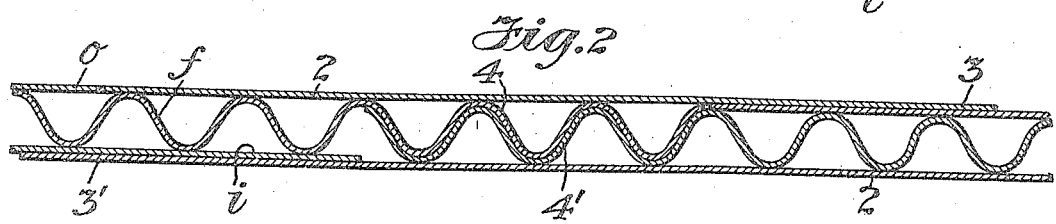
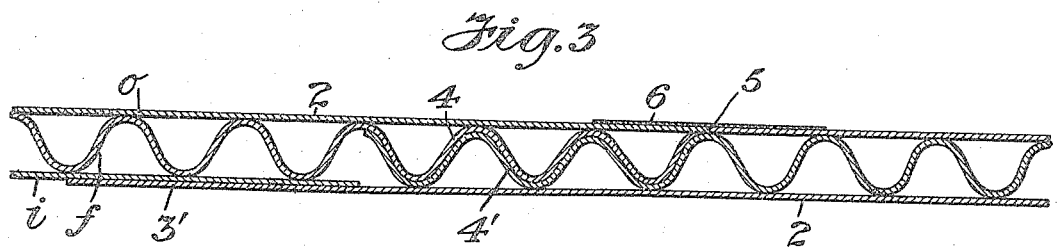
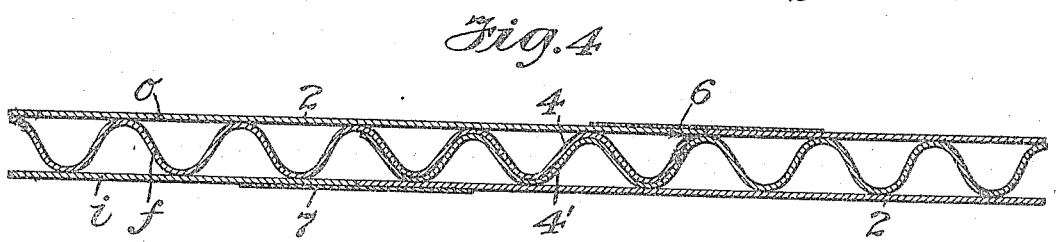
INVENTOR
Frank G. Feeley
BY
HIS ATTORNEY

UNITED STATES PATENT OFFICE.

FRANK G. FEELEY, OF CHICAGO, ILLINOIS, ASSIGNOR TO M. D. KNOWLTON COMPANY, OF ROCHESTER, NEW YORK, A CORPORATION OF NEW YORK.

JOINT FOR CORRUGATED PAPER-BOARD.

1,207,734.  Specification of Letters Patent.  Patented Dec. 12, 1916.

Application filed April 11, 1916. Serial No. 90,341.

*To all whom it may concern:*

Be it known that I, FRANK G. FEELEY, a citizen of the United States, and resident of Chicago, in the county of Cook and State of Illinois, have invented certain new and useful Improvements in Joints for Corrugated Paper-Board, of which the following is a specification.

This invention relates to a joint for faced corrugated paperboard, such for instance as employed in joining the ends of box blanks in the manufacture of corrugated paperboard boxes, and has for its object to provide an improved joint of this character having a strength at least equal to that of the board itself.

It has been common practice in the manufacture of boxes or other articles from corrugated paperboard to join the ends of the blanks for the boxes or other articles by means of a tape adhesively applied to the lining sheets at one side of the board. A joint formed in this manner, however, obviously is the weakest part of the article, and in order to provide an improved joint of desired strength, it has heretofore been proposed to utilize the lining sheets of the board for such purpose by having the lining sheet of one section overlap the lining sheet of the adjacent section and securing the same thereto by an adhesive or other fastening means. A joint formed by properly utilizing the lining sheets in this way results in a joint of 100% efficiency for corrugated board as heretofore constructed, that is, board which has been made primarily with a view to producing a material that would be of a yielding nature, so that goods packed in a box made from it would be protected from undue shock and breakage, and to meet which objection it has been necessary to use a corrugated sheet that would be yielding and not necessarily have any particular strength.

In the further development of the corrugated paperboard industry, however, it is proposed to make up a board with a much heavier corrugated sheet or filler than heretofore, with a view to obtaining maximum stiffness and rigidity, and it has therefore been the more special object of my present invention to provide a joint for this particular type of stiff and rigid board, that will have a strength, stiffness and rigidity, at least equal to that of the board itself.

In carrying one form of my invention into effect in joining two sections of double-faced corrugated board, I remove an end portion of the inner lining sheet from one section and an end portion of the outer lining sheet from the other section so as to uncover portions of the corrugated sheets of the two sections, then mate the sections thus treated so as to bring the uncovered portions of the corrugated sheets into overlapping and interlocking relation with each other, and then secure together the adjacent ends of the lining sheets at the opposite sides of the board sections.

In the accompanying drawings—Figure 1 is a perspective view of two sections of double-faced corrugated paperboard, treated for the formation of a joint in accordance with my invention. Fig. 2 is a cross-sectional detail of the two sections joined together. Figs. 3 and 4 are similar views illustrating modifications of the invention to be hereinafter referred to in detail.

Similar reference characters indicate like parts on the several figures of the drawings.

2—2 designate two end sections of double-faced corrugated paperboard suitable for the purpose of forming my improved joint. This means that the several sheets constituting the board, comprising the inner liner $i$, the outer liner $o$, and the corrugated filler $f$, will preferably be formed of stock sufficiently heavy to provide a stiff and rigid board.

In the preferred form of my invention shown in Figs. 1 and 2, a portion of the filler and one of the lining sheets, as indicated by dotted lines in Fig. 1, is removed from each of the adjacent ends of the two sections, that is, one section has a portion of its corrugated filler removed to provide a projecting length 3 of the outer lining sheet and a portion of its inner lining sheet removed to uncover a portion 4 of the corrugated filler, while the other section has a portion of its corrugated filler removed to provide a projecting length 3' of its inner lining sheet and a portion of its outer lining sheet removed to uncover a portion 4' of the corrugated filler. The two sections thus treated are then mated, as shown in Fig. 2, with the uncovered portions of their corrugated fillers overlapping and interlocking with each other and with the projecting length of lining sheet of each section overlapping the adjacent lining sheet of the other section, to which it is firmly secured by an adhesive or other suitable fastening means. A joint thus formed, providing a continuous truss construction through the board at the joint thereof, obviously is of greater strength than the board itself.

In Fig. 3, I have shown a modified form of the joint, consisting in butt-jointing the ends of the outer lining sheets, as at 5, and connecting the same with an adhesive tape 6, instead of providing a lap-joint between such lining sheets as in Fig. 2.

In Fig. 4, I have shown another modified form of joint, consisting in butt-jointing the ends of both the outer and inner lining sheets, and connecting the same with adhesive tapes, 6 and 7. The joints of both Figs. 3 and 4, however, aside from the described change in the method of connecting the lining sheets, are the same as that of Fig. 2.

While I have shown my improved joint as a joint for double-faced corrugated paperboard, it will be understood that it may also be used in connection with single-faced corrugated board and claims for such use are herein made.

What I claim is:—

1. A joint for faced corrugated paperboard, comprising a pair of complementary board sections, one of which has a portion of the lining sheet removed to uncover a portion of the corrugated sheet, and the two sections being mated with the said uncovered portion of the corrugated sheet of one section overlapping and interlocking with the corrugated sheet of the other section, and means connecting the adjacent ends of the lining sheets of the two sections.

2. A joint for faced corrugated paperboard, comprising a pair of complementary board sections, one of which has a portion of the lining sheet and the other of which has a portion of the corrugated sheet removed to provide a projecting length of lining sheet, the two sections being mated with the uncovered portion of the corrugated sheet of one section overlapping and interlocking with the corrugated sheet of the other section and with the projecting length of lining sheet of the latter section overlapping a portion of the lining sheet of the first section, and means securing said overlapping portion of the lining sheet of one section to the underlying lining sheet of the other section.

3. A joint for double-faced corrugated paperboard, comprising a pair of complementary board sections, one of which has a portion of the inner lining sheet removed and the other of which has a portion of the outer lining sheet removed to uncover portions of the corrugated sheets of the respective sections, the two sections being mated with the uncovered portions of their corrugated sheets overlapping and interlocking with each other, and means connecting the adjacent ends of the lining sheets at the opposite sides of the board sections.

4. A joint for double-faced corrugated paperboard, comprising a pair of complementary board sections, one of which has a portion of the inner lining sheet removed and the other of which has a portion of the outer lining sheet removed to uncover portions of the corrugated sheets of the respective sections, and one of which sections also has a portion of its corrugated sheet removed to provide a projecting length of lining sheet, the two sections being mated with the uncovered portions of their corrugated sheets overlapping and interlocking with each other and with the said projecting length of lining sheet of one section overlapping a portion of the adjacent lining sheet of the other section, and means connecting the adjacent ends of the lining sheets at the opposite sides of the board sections.

5. A joint for double-faced corrugated paperboard, comprising a pair of complementary board sections, each of which has a portion of its corrugated sheet removed to provide a projecting length of lining sheet at one side thereof and a portion of its opposite lining sheet removed to provide an uncovered portion of corrugated sheet, the two sections being mated with the uncovered portions of their corrugated sheets overlapping and interlocking with each other and with the projecting length of lining sheet of each section overlapping the adjacent portion of the other section, and means securing the overlapping length of lining sheet of each section to the underlying portion of the other section.

Signed at Chicago, in the county of Cook, and State of Illinois, this 5th day of April A. D. 1916.

FRANK G. FEELEY.

Witnesses:
D. MEYER,
R. C. GULLEN.